United States Patent [19]
Golding

[11] Patent Number: 6,128,699
[45] Date of Patent: Oct. 3, 2000

[54] METHOD FOR PROVIDING READ/WRITE ACCESS WHILE COPYING DATA BETWEEN SHARED STORAGE DEVICES

[75] Inventor: Richard A. Golding, San Francisco, Calif.

[73] Assignee: Hewlett-Packard Company, Palo Alto, Calif.

[21] Appl. No.: 09/181,067

[22] Filed: Oct. 27, 1998

[51] Int. Cl.[7] .................................................. G06F 12/02
[52] U.S. Cl. ........................... 711/112; 711/150; 711/114
[58] Field of Search ..................................... 711/112, 150, 711/161, 168, 158, 173, 4, 114; 710/20; 707/8; 714/20

[56] References Cited

U.S. PATENT DOCUMENTS

| | | | |
|---|---|---|---|
| 5,247,618 | 9/1993 | Davis et al. | 710/21 |
| 5,247,665 | 9/1993 | Matsuda et al. | 707/101 |
| 5,297,258 | 3/1994 | Hale et al. | 711/114 |
| 5,546,536 | 8/1996 | Davis et al. | 714/20 |
| 5,592,648 | 1/1997 | Schultz et al. | 711/114 |

*Primary Examiner*—Eddie P. Chan
*Assistant Examiner*—Hong Kim

[57] ABSTRACT

A storage system for storing and retrieving data records having a plurality of storage devices and a system controller. The storage devices include a storage medium, a device controller, and a message log. The storage medium stores data records, the data records being indexed by addresses which specify the location of the data records in the storage medium. The device controller receives write messages from processors coupled to the controller. Each write message includes a data segment to be written to the storage medium at a specified address, and linkage information specifying a timestamp, the addresses of other data records on other storage systems that were written in the same write operation, and the original source of the data segment. The system controller is responsive to a copy-write message specifying a source region on one of the storage devices, the "source", that is to be copied to a target region on one of the storage devices, the "target". The copy-write message specifying said source region, said target region, and said target. The copy-write message causes the system controller to read the source region and the linkage records associated therewith, to modify the associated linkage records to indicate that the source region on the target is the original source of the source region if the source region was not created by a previously executed copy-write message, and to write the source region and the associated linkage records, including any modifications thereto, to the target via one of the write messages.

6 Claims, 3 Drawing Sheets

METHOD FOR PROVIDING READ/WRITE ACCESS WHILE COPYING DATA BETWEEN SHARED STORAGE DEVICES

FIELD OF THE INVENTION

The present invention relates to data storage systems, and more particularly, to a method for reading and writing data across multiple storage devices while data is being copied between two or more of the storage devices.

BACKGROUND OF THE INVENTION

Consider a computer system in which multiple hosts access an array of disks across a network. At any time, the hosts may be attempting to access the data for read and write operations. In addition, copies of the data may be in progress in which data is being copied from one disk to another by a disk controller that implements a data copy protocol. It would be advantageous to allow the various hosts to continue to read and write data even though the data is being copied from one disk to the other. However, the need to maintain the data in a consistent state causes problems. At the end of the copy operation, both copies of the data should be same.

For the purposes of the present discussion, the disks involved in the copy operation will be referred to as the source and target disks, the data being copied from the source disk to the target disk. There are two situations that can lead to inconsistent data. First consider the case in which a host is reading data that is currently involved in a copy operation. If no preventive action is taken, the host is free to choose either of the source or target disk as the source of the data. If the host chooses the target, part of the data may not have yet been copied, i.e., the host will receive invalid data.

Second, consider the case in which the host is writing data to a region that is currently being copied from the source disk to the target disk. The "write" from the host is directed to both the source and target disks that are concurrently engaged in a copy operation involving the same area of the disks. The source disk will receive one write from the host. The target disk will receive two write messages for the region being copied, one from the source disk and one from the host. Because of unpredictable delays in the network, the order at which the writes arrive at the target disk is uncertain. If the write from the source disk leaves the source before the new data arrives from the host but arrives at the target disk after the write from host arrives, the copies will no longer match, since copy data will overwrite the new data from the host.

To avoid the possibility of data errors, prior art systems utilize a locking mechanism of some type during the copy operation. While the data is being copied, no other read or write operations are allowed. To minimize the cost of this approach, the data being copied is typically divided into three regions, data that has been copied, data that is being copied, and data that has not yet been copied. In this case, the lock is applied only to the regions that are being copied. The lock is moved each time the copy operation is completed on the "being copied" portion of the data. This approach reduces, but does not eliminate, the delays encountered when portions of the data are locked. In addition, the locking mechanism imposes an overhead on the system. The disk system must test for a lock each time an I/O request is received.

Finally, the moving lock approach imposes an order on the copy operations. The data records must be sent in the order they are stored. In some cases, a more efficient order may be possible. For example, the sequence of sectors that can be most rapidly read from the disk may be different from the sequence of records in the file being copied. It would be advantageous to be able to send the records in any order and have the target disk assemble them.

Broadly, it is the object of the present invention to provide an improved method of operating a data storage system in which data is being copied between disks while other computers are reading and writing data to the storage system.

It is a further object of the present invention to provide a method of copying data between disks that does not require the use of a lock that prevents other computers in the system from reading the data during the copy operation.

It is a still further object of the present invention to provide a method for copying data between disks that allows the records to be transferred in an arbitrary order without utilizing a locking mechanism.

These and other objects of the present invention will become apparent to those skilled in the art from the following detailed description of the invention and the accompanying drawings.

SUMMARY OF THE INVENTION

The present invention is a storage system for storing and retrieving data records having a plurality of storage devices and a system controller. The storage devices include a storage medium, a device controller, and a message log. The storage medium stores data records, the data records being indexed by addresses which specify the location of the data records in the storage medium. The device controller receives write messages from processors coupled to the controller. Each write message includes a data segment to be written to the storage medium at a specified address, and linkage information specifying a timestamp, the addresses of other data records on other storage systems that were written in the same write operation, and the original source of the data segment. The system controller is responsive to a copy-write message specifying a source region on one of the storage devices, the "source", that is to be copied to a target region on one of the storage devices, the "target". The copy-write message specifying said source region, said target region, and said target. The copy-write message causes the system controller to read the source region and the linkage records associated therewith. The system controller then modifies the associated linkage records to indicate that the source region on the target is the original source of the source region if the source region was not created by a previously executed copy-write message. Finally, the system controller writes the source region and the associated linkage records, including any modifications thereto, to the target via one of the write messages.

DETAILED DESCRIPTION OF THE INVENTION

To simplify the following discussion, the present invention will be explained in terms of disks; however, it will become apparent from the discussion that the method of the present invention may be applied to other forms of storage devices. In addition, the following discussion will utilize examples in which data is copied from one disk to another. However, it will become apparent from the discussion that the method can be applied in situations in which multiple copies are being maintained and in which many separate copy operations are proceeding concurrently.

The present invention is based on two observations. First, the problem with copied data interfering with newly written data from a host on the system arises from a lack of serialization of the writes. That is, the updates to the source disk are not necessarily ordered in the same order as the updates to the target disk. Second, the problem of reading from both the source and target disks and getting inconsistent answers is due to a lack of atomicity. That is, there is no requirement that the copy be completed before any other computer can access the data.

The present invention utilizes an extension of a scheme in which each disk stores two additional types of data associated with each write, a time stamp and "coordination information". This scheme is discussed in detail in co-pending patent application 09/036,617 filed Mar, 7, 1998 which is hereby incorporated by reference. Accordingly, the details of this storage scheme will not be discussed in detail here.

For the purposes of this discussion, the underlying storage scheme will be discussed with reference to FIGS. 1–2, which illustrate a write, and read operation directed to two disks 20 and 30. Each disk includes a storage medium shown at 21 and 31 which is used for storing the data records in a manner analogous to that used in conventional disk drives. The location of any given data record is specified by an address on the storage medium. If the storage medium is a conventional disk drive, the address typically specifies a track and sector.

Each disk also has a controller, shown at 22 and 32, respectively. The controllers process messages received by the disks and perform the various storage functions discussed below. To simplify the following discussion, it should be understood that a statement to the effect that a disk performed some operation is equivalent to stating that the controller in the disk performed the operation. Each disk according to the present invention also includes a log for storing write messages received by that disk. The logs are shown at 23 and 33, respectively.

Figure 1:
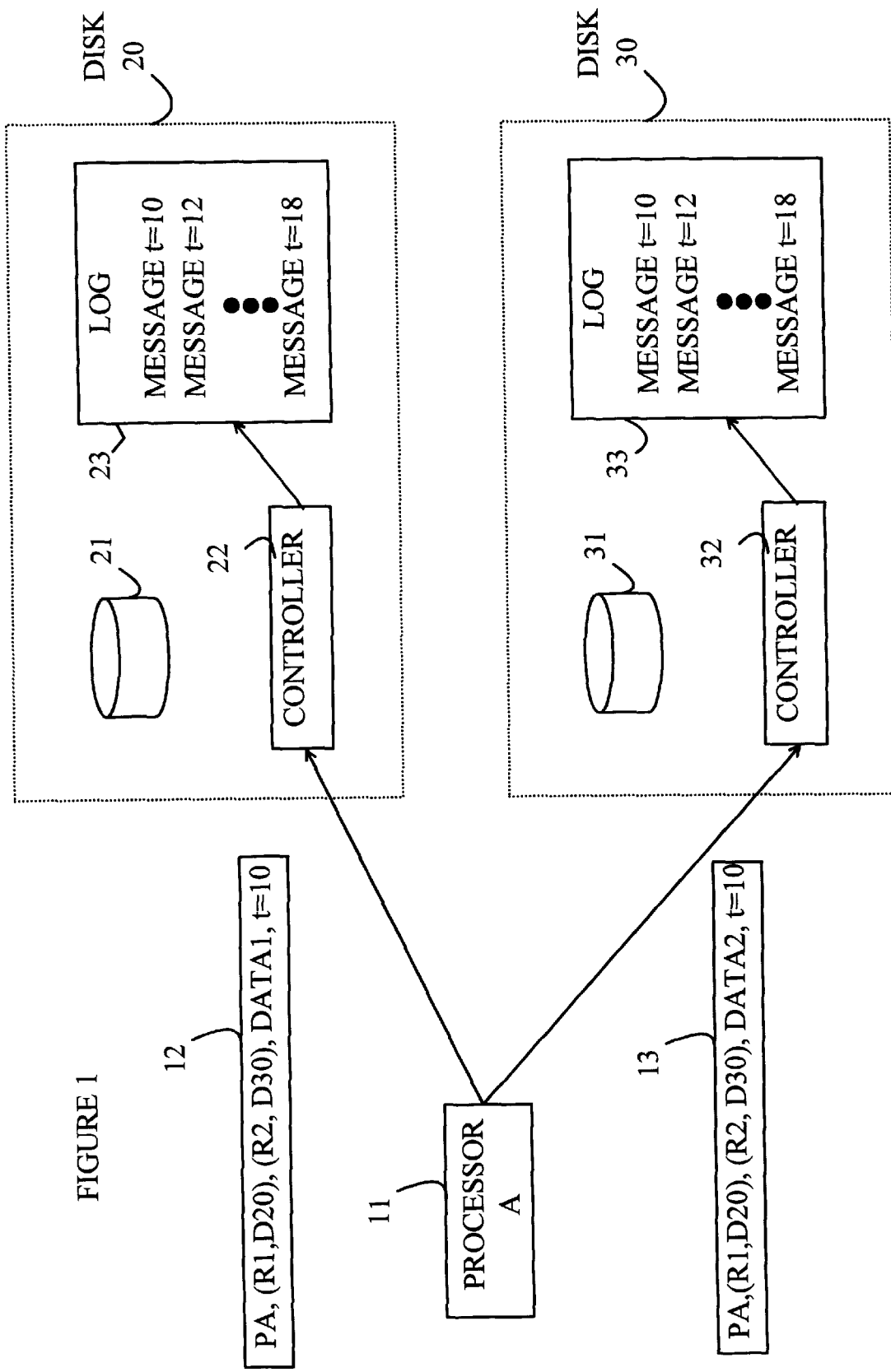
FIG. 1 illustrates an atomic write in a storage system according to the resent invention.
Figure 2:
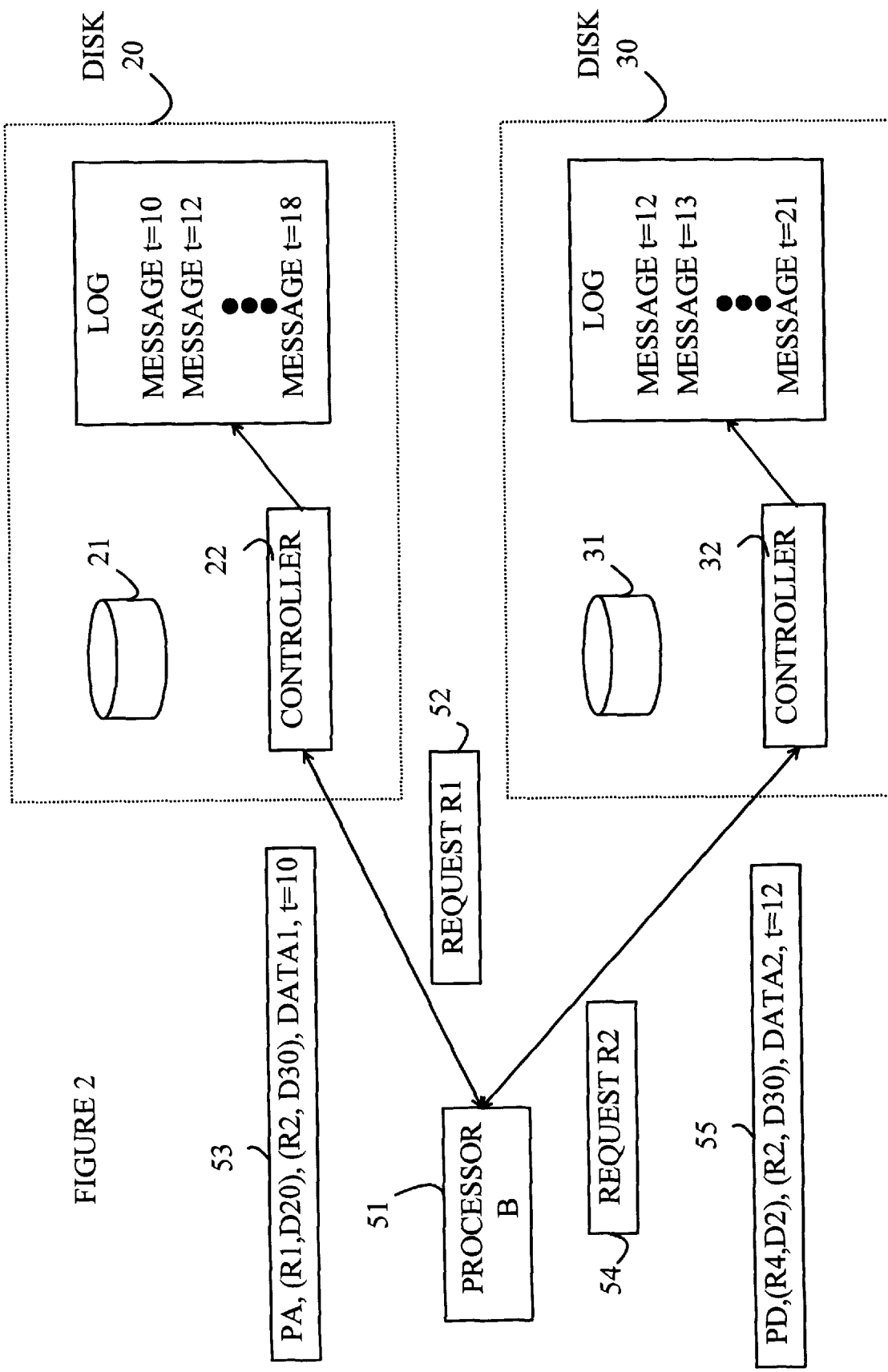
FIG. 2 illustrates a read operation in a storage system according to the present invention.

In the simple example shown in FIGS. 1–2, processor A shown at 11 in FIG. 1 writes a first data segment DATA1 to region R1 of disk 20 and a second data segment DATA2 to region R2 of disk 30. For the purposes of this example, each data segment consists of one or more contiguous records that will eventually be written into the storage medium. The write messages generated by processor A, which are shown at 12 and 13, include two additional pieces of data. The first is a time stamp indicating when the transaction that wrote that data occurred. The second includes linkage information identifying the processor that wrote the data and the other disks to which data was written as part of the transaction. This additional information will be referred to as "coordination information" in the following discussion. In the example shown in FIG. 1, the write messages were generated at t=10.

By including timing information in the coordination information included in the write commands sent to disks, each disk can independently arrive at a consistent order for processing the write commands while requiring only a single message exchange. As will be discussed in detail below, this same timing and coordination information can be used on read operations to detect inconsistencies between disks and to resolve the inconsistencies to generate a consistent response.

Upon receiving a write message, each disk stores the message in the log associated with that disk. After a sufficient time interval has elapsed, the data in the logged message is stored in the storage medium. For the purposes of this discussion, it will be assumed that the coordination information is also written to the storage medium.

Refer now to FIG. 2. Some time after processor A has sent the write message discussed above, processor B shown at 51 requests the data stored at region R1 on disk 20 and region R2 on disk 30 by sending read messages to the disks as shown at 52 and 54. Disk 20 returns the message shown at 53 indicating that the data record it has for R1 was written in by a message bearing a timestamp of t=10 sent by processor PA and that the write operation that generated this message also wrote data to R2 on D30.

There are three possible messages that disk 30 could return. First, it could return the message shown at 13 in FIG. 1. This would be a consistent data entry, since it indicates that the last write to disk 30 affecting region R2 was in fact the atomic write shown in the message returned by disk 20.

The second possibility would be that disk 30 returns a message with a later timestamp than that returned by disk 20. This is the message shown at 55 in FIG. 4. This would also be a consistent data entry. Such a situation would arise from the case in which another processor, i.e., PD in this case, updated R2 on disk 30 without updating R1 on disk 20. In the message shown at 55, processor PD updated R2 on disk 30 and region 4 on disk 20 in an atomic write message bearing the timestamp t=12. The message also includes the data, DATA2, provided in that write for region R2. Such a situation can occur in a database in which the database records are spread between the disks.

The third possibility would be that disk 30 returns a message with an earlier timestamp than t=10. This would clearly indicate an inconsistent data situation, since message 53 indicates that R2 was updated at t=10. Hence, this message must have been lost.

The preceding simple example involved only the situation in which two disks were involved and all of the region requested by the second processor from each disk had been written in a single write operation. In general, the coordination data includes a list all of the regions that are being updated by the processor on the other disks in the system. In addition, any given region may have been updated in pieces by different messages.

In general, a write begins when the processor sending the update to the disks obtains a timestamp t from its local clock. Each processor's local clock must be synchronized with the clocks of the other processors on the network to within some maximum allowed time difference $\Delta t$.

Next, the sending processor sends a write request message to each disk that is to be updated. Denote the set of regions on the disks to be updated by R. The processor sends a message to each disk d that stores data that is part of R. The message that is sent to disk d contains the coordination information and the data to be written to disk d. The coordination information consists of the timestamp t, a unique identification code identifying the processor sending the message, and a list of the entire set of regions, R, that is being updated in this write.

Each disk receiving a message compares the message timestamp t to the disk's local clock c to determine if the message was sent within a reasonable time frame. If the message is too old, the receiving disk will discard the message. Similarly, if the message is too new, there could be a timing synchronization problem. Hence, the recipient disk tests to see if the timestamp on the message is more than T seconds older than c (that is, c>t+T). Similarly, the recipient disk checks for a message that is too new (t>c+Δt). Here Δt is the maximum allowed difference among clocks. If the timestamp fails either of these two tests, the disk sends a negative acknowledgment back to the sender and discards the message. This forces the sender to re-send the message in the case of a message that is too new.

If the timestamp passes the above test, the disk places the message in a log, which is preferably stored in non-volatile storage associated with the disk's controller. The messages in the log are ordered by timestamp. If two messages have the same timestamp, the identification code of the sending processor is used to break the tie. Upon accepting the message, the disk sends a positive acknowledgment message back to the sending processor.

Each disk periodically reviews the messages in its log. If the disk finds messages in the log that are at least T seconds old, the disk processes the messages in the order of the timestamps on the messages by writing the associated data to the appropriate location on disk, then discarding the message.

The read protocol reads a set of regions R from a set of disks D. To simplify the discussion, it will be assumed that one read operation only involves one contiguous region from any one disk. The goal of the read protocol is to provide the processor requesting the data either with a consistent set of data, or an inconsistent set of data and an indication that the data is inconsistent.

A processor wishing to read a region of a disk, sends a read request message to the disk, and the disk replies with both the data and the coordination information recorded in the disk's log when that data was received. The processor then uses the returned coordination information to cross-check whether the disks' replies are consistent with each other.

The processor wishing to read data sends a request message to each disk. The request message contains only the region that is to be read from that disk. Each disk receiving a request message for the data stored for a region, r, consults its log to find the newest message, n, that contains data for that region. That message, if it exists, may cover only part of the region requested. If message n covers only part of the region, region r is split into two, or possibly three, regions, the one covering the portion of the region found in message n and the remaining portions of the region. In the worst case, the region covered by message n can provide a portion of the data in the middle of region r, and hence, two fragments remain, one on each side of the region covered by message n. This step is then recursively applied on the remaining fragments until all messages related to region r are found. Each message is returned. Hence, the requesting disk receives one or more messages. Each message provides a part of the data requested and the coordination information that was received in the messages that provided that part of the data.

The processor checks each response message for consistency. In general, the response message for the $k^{th}$ region includes a data block $W_k$ having the data stored on the disk for region $r_k$, a timestamp, $t_k$, and a list other regions, $r_j$, for j=1 to $N_k$, that were written as part of the atomic write in which $r_k$ was written. If one of the other regions is also a region the processor is attempting to read in the current operation, the processor will also have received the data for this region and its associated coordination information in a response to a read message received from the appropriate disk.

When the processor has collected all of the response messages relating to the coordination information returned with the message for $r_k$, the processor compares the timestamps in each of these messages. Consider the response messages corresponding to region $r_j$. There are three possibilities, $t_k<t_j$, $t_k=t_j$, or $t_k>t_j$. If $t_k \leq t_j$, the response for $r_j$ is consistent with that for $r_k$. The case in which $t_k<t_j$ indicates that $r_j$ was updated in a transaction subsequent to the atomic write in which $r_k$ was updated. This situation can occur in multiple disk writes such as those that occur when a database is spread across several disks. If $t_k>t_j$, there is clearly an inconsistency between $r_k$ and $r_j$, since the message from the atomic write that updated $r_k$ indicated that $r_j$ was also updated at the same time, yet that update message was obviously not processed by the disk on which $r_j$ was stored. The manner in which inconsistencies are processed is discussed in detail in the above-identified co-pending patent application, and hence, will not be discussed here.

Having discussed the underlying storage system, the manner in which this storage system is augmented to solve the problems discussed above with respect to a copy operation will now be discussed. For the purposes of the present discussion it will be assumed that the source and target disks are under the control of a system disk controller which controls the copy operation. The system controller disk can be a separate data processor or its functions can be incorporated into the individual disk controllers. To simplify the following discussion, the system disk controller will be treated as a separate data processor.

Figure 3:
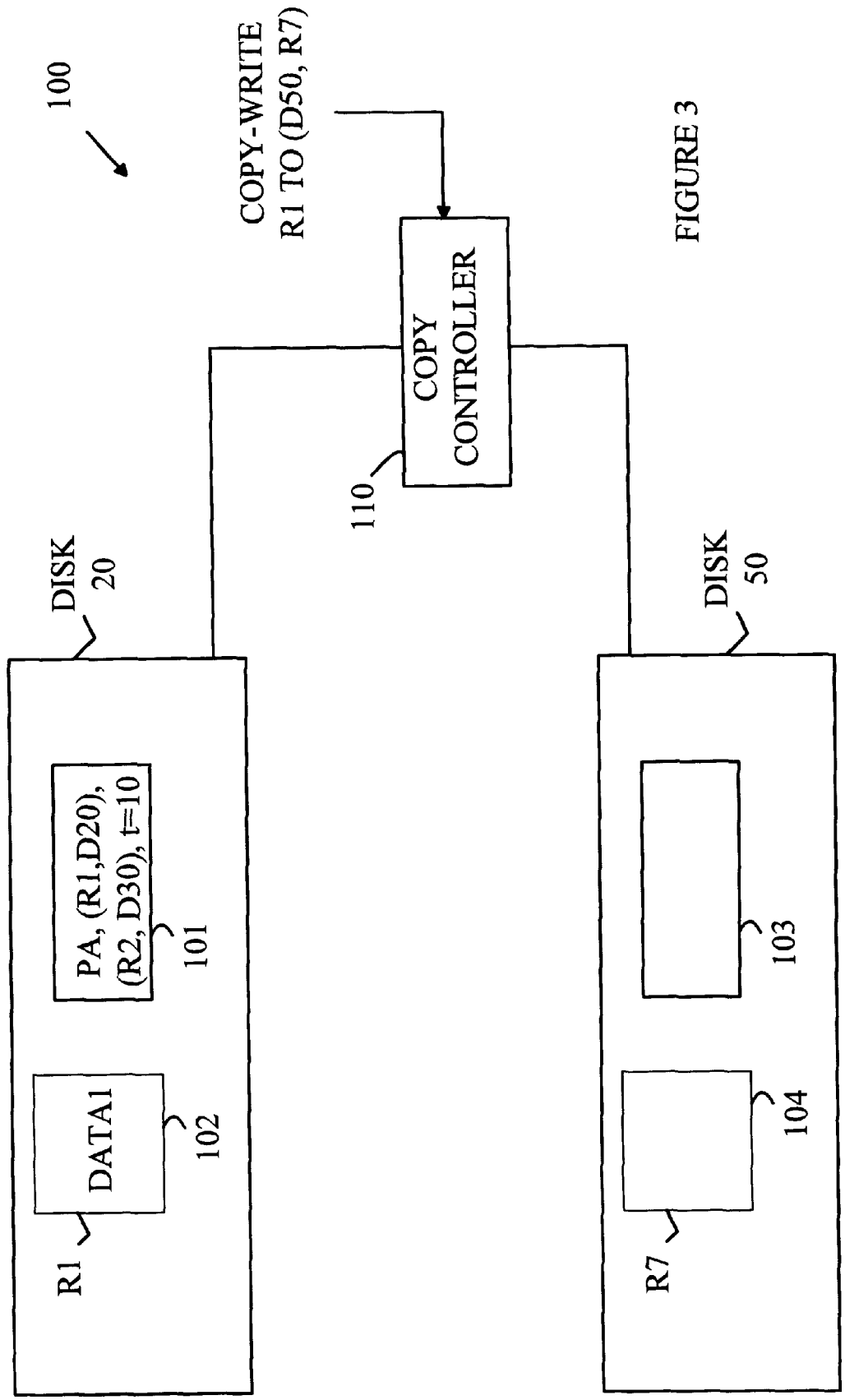
FIG. 3 illustrates the manner in which a "copy-write" instruction transfers data from one disk to another.

The present invention adds a special "copy-write" operation to the system controller's repertoire. Refer to FIG. 3, which illustrates the operation of the copy-write instruction with respect to a simple copy in which a single region R1 on Disk 20 is copied to region R7 of Disk 50 in a storage system 100. The data shown in R1 on disk 20 is the data that resulted from the write discussed above with reference to FIG. 1. The linkage information shown at 101 indicates the source of the data, the timestamp associated with the data, and the other disks and regions that were written at the same time.

The copy-write command specifies a region on a source disk that is to be copied to a region on a specified target disk. In the example shown in FIG. 3, region R1 of disk 20 is to be copied to region R7 shown at 104 on disk 50. The copy-write operation occurs in two steps. First, the destination region on the target disk is initialized by the system disk controller 110. This can be accomplished by executing a write to disk 20 for region R1 with a timestamp of 0 which acts as a special timestamp indicating that the associated region does not include meaningful data. If the copy-write operation involves a number of different regions, a separate initialization linkage record is created for each such region. At the end of the initialization operation, the linkage record for R7, which is stored at 103 on disk 50, will contain a timestamp of 0. If a read request for R7 arrives before the copy is complete, the returned linkage record will indicate this special timestamp value and the host receiving the information will know that the returned information is invalid.

The actual copy portion of the copy-write operation is performed in three steps by system controller 110. First, controller 110 reads R1 and the linkage record 101 from disk 20. Second, controller 110 alters the linkage information by inserting an annotation indicating that the associated data segment is a copy of region R1 on disk 20. If the linkage information already indicates that the region is a copy, controller 110 does not alter this information. Hence, the linkage information will always point back to the original write that created the data segment. Finally, controller 110 writes the data segment to disk 50 using a conventional write that includes the modified linkage information.

Consider the case in which a host other than controller 110 sends an ordinary write message to both the source and target disks while a copy is taking place. If the source is updated by the write before the source sends a copy-write to the target, both the copy-write and ordinary write will have the same timestamp and data. In this case, the target will chose the first message it receives for the update of its storage medium. If the source is not updated before it sends its copy-write message, then the copy-write message will have a timestamp that is older than the ordinary write message. The target sees the older timestamp and discards the message in favor of the ordinary write message no matter which order the copy-write and ordinary write messages are received. Hence, it will be apparent that the present invention solves the serialization problem that interferes with writes without requiring that the disks be locked.

Assuring that data is correct during a read is achieved in two steps. First, the target disk initialization discussed above prevents problems arising from attempts to read the target area prior to the copy being completed. A host requesting data will receive a record with a timestamp of 0 and know that the data is not valid.

Second, when the target disk receives the copy of the data, it records the timestamp and linkage information along with the data. If data is copied multiple times, the source designation is always that of the original source disk. When a host receives a record indicating that it is a copy of another record, the host treats the record as if it were from the source specified in the linkage information. For example, a host receiving a returned data record of R7 and the associated linkage information from disk 50 re-labels the message as R1 from Disk 20 for the purposes of checking the consistency of the data. The host then tests the data as described above.

If an inconsistency is detected, the host can try to recover from the problem by re-reading the out-of-date data. If the failure is the result of uninitialized data, re-reading the data after the copy-write is completed should yield valid data.

Various modifications to the present invention will become apparent to those skilled in the art from the foregoing description and accompanying drawings. Accordingly, the present invention is to be limited solely by the scope of the following claims.

What is claimed is:

1. A storage system for storing data records, said storage system comprising a system controller and a plurality of storage devices, each of said storage devices comprising:

a storage medium for storing data records, said data records being indexed by addresses which specify the location of said data records in said storage medium;

a disk controller for receiving write messages from processors coupled to said controller, each write message including a data segment to be written to said storage medium at a specified address, and a linkage record specifying a timestamp, the addresses of other data records on other storage devices that were written in the same write operation, and the original source of said data segment; and a log for storing said linkage records and associating each of said linkage records with said data segment that was received with said linkage record, wherein said system controller is responsive to a copy-write message specifying a source region on one of said storage devices, the "source", that is to be copied to a target region on one of said storage devices, the "target", said copy-write message specifying said source region, said target region, and said target, said copy-write message causing said system controller to read said source region and said linkage records associated therewith, modify said associated linkage records to indicate that said source region on said target is the original source of said source region if said source region was not created by a previously executed copy-write message, and to write said source region and said associated linkage records, including any modifications thereto, to said target via one of said write messages.

2. The storage system of claim 1 wherein said system controller causes a linkage record having a predetermined timestamp to be stored for said target region on said target prior to said source region being copied to said target region.

3. The storage system of claim 1 wherein said system controller comprises one of said disk controllers.

4. A method for causing a storage system comprising a system controller and a plurality of storage devices, to store and retrieve data across multiple storage devices, each of said storage devices comprising:

a storage medium for storing data records, said data records being indexed by addresses which specify the location of said data records in said storage medium;

a disk controller for receiving write messages from processors coupled to said controller, each write message including a data segment to be written to said storage medium at a specified address, and a linkage record specifying a timestamp, the addresses of other data records on other storage devices that were written in the same write operation, and the original source of said data segment; and a log for storing said write messages, said method comprising the steps of:

causing a processor wishing to copy data from a source region on one of said storage devices, the "source", to a target region on one of said storage devices, the "target", to read said source region and said linkage records associated therewith, modify said associated linkage records to indicate that said source region on said target is the original source of said source region if said source region was not created by a previously executed copy-write message, and to write said source region and said associated linkage records, including any modifications thereto, to said target via one of said write messages.

5. The method of claim 4 wherein said processor causes a linkage record having a predetermined timestamp to be stored for said target region on said target prior to said source region being copied to said target region.

6. The storage system of claim 4 wherein said processor is one of said disk controllers.

* * * * *